United States Patent
Quach et al.

(10) Patent No.: US 7,315,920 B2
(45) Date of Patent: *Jan. 1, 2008

(54) CIRCUIT AND METHOD FOR PROTECTING VECTOR TAGS IN HIGH PERFORMANCE MICROPROCESSORS

(75) Inventors: Nhon Quach, San Jose, CA (US); John Crawford, Los Gatos, CA (US); Greg S. Mathews, Santa Clara, CA (US); Edward Grochowski, San Jose, CA (US); Chakravarthy Kosaraju, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 245 days.

This patent is subject to a terminal disclaimer.

(21) Appl. No.: 11/028,293

(22) Filed: Jan. 4, 2005

(65) Prior Publication Data

US 2005/0120184 A1    Jun. 2, 2005

Related U.S. Application Data

(60) Continuation of application No. 10/743,069, filed on Dec. 23, 2003, now Pat. No. 6,904,502, and a continuation of application No. 10/726,492, filed on Dec. 4, 2003, now Pat. No. 6,839,814, and a division of application No. 10/435,386, filed on May 12, 2003, now Pat. No. 6,775,746, which is a division of application No. 09/750,094, filed on Dec. 29, 2000, now Pat. No. 6,675,266.

(51) Int. Cl.
*G06F 12/00* (2006.01)
(52) U.S. Cl. ............... 711/145; 711/144; 711/156
(58) Field of Classification Search ............... 711/145, 711/144, 156
See application file for complete search history.

(56) References Cited

U.S. PATENT DOCUMENTS

| 4,910,668 | A | 3/1990 | Okamoto et al. |
| 6,166,939 | A | 12/2000 | Nataraj et al. |
| 6,510,506 | B2 | 1/2003 | Nagapudi |
| 6,622,284 | B1 | 9/2003 | Naffziger et al. |

*Primary Examiner*—Jack Lane
(74) *Attorney, Agent, or Firm*—Kenyon & Kenyon LLP

(57) ABSTRACT

The present invention relates to the design of highly reliable high performance microprocessors, and more specifically to designs that use cache memory protection schemes such as, for example, a 1-hot plus valid bit scheme and a 2-hot vector cache scheme. These protection schemes protect the 1-hot vectors used in the tag array in the cache and are designed to provide hardware savings, operate at higher speeds and be simple to implement. In accordance with an embodiment of the present invention, a tag array memory including an input conversion circuit to receive a 1-hot vector and to convert the 1-hot vector to a 2-hot vector. The tag array memory also including a memory array coupled to the input conversion circuit, the memory array to store the 2-hot vector; and an output conversion circuit coupled to the memory array, the output conversion circuit to receive the 2-hot vector and to convert the 2-hot vector back to the 1-hot vector.

36 Claims, 7 Drawing Sheets

CIRCUIT AND METHOD FOR PROTECTING VECTOR TAGS IN HIGH PERFORMANCE MICROPROCESSORS

CROSS REFERENCE TO RELATED APPLICATIONS

This application is a continuation of application Ser. No. 10/726,492 filed Dec. 4, 2003 now U.S. Pat. No. 6,839,814, which is divisional of application Ser. No. 09/750,094 filed Dec. 29, 2000, now U.S. Pat. No. 6,675,266, and a divisional of application Ser. No. 10/435,386 filed May 12, 2003, now U.S. Pat. No. 6,775,746, which is also a divisional of application Ser. No. 09/750,094, filed Dec. 29, 2000 now U.S. Pat. No. 6,675,266; this application is also a continuation of application Ser. No. 10/743,069 filed Dec. 23, 2003 now U.S. Pat. No. 6,904,502, which is a continuation of application Ser. No. 10/435,386 filed May 12, 2003 now U.S. Pat. No. 6,775,746, which is a divisional of application Ser. No. 09/750,094 filed Dec. 29, 2000 now U.S. Pat. No. 6,675,266, all of which are hereby incorporated herein in their entireties by reference thereto.

FIELD OF THE INVENTION

The present invention relates to the design of highly reliable high performance microprocessors, and more specifically to designs using a 2-hot vector tag protection scheme in high speed memories.

BACKGROUND

Modern high-performance processors, for example, Intel® Architecture 32-bit (IA-32) processors, include on-chip memory buffers, called caches, to speed up memory accesses. IA-32 processors are manufactured by Intel Corporation of Santa Clara, Calif. These caches generally consist of a tag array and a data array. The data array generally stores the data that is needed during the execution of the program. The tag array generally stores either a physical address or a virtual address of the data as tags. For reliability reasons, these stored tags are often protected for error detection by associating a separate parity bit with each tag. In even higher performance processors, for example, Intel® Architecture 64-bit (IA-64) processors, each tag is generally stored as a 1-hot vector in a 1-hot cache, which is derived during a Translation Look-aside Buffer (TLB) lookup for an address translation. IA-64 processors are manufactured by Intel Corporation of Santa Clara, Calif. A "1-hot vector" is an n-bit, binary address in which a single bit is set to specify a matching address translation entry in the TLB. The advantage of using a 1-hot vector as a tag is that it improves the operating frequency of a cache. Unfortunately, the protection of these 1-hot vectors presents a great challenge since the conventional parity bit protection scheme used to protect the standard tag in the conventional cache does not work well for the 1-hot vectors. For example, when an entry in the TLB is replaced, all of the tags with the corresponding 1-hot vectors in the 1-hot cache must be invalidated. This invalidation can be performed using a blind invalidate operation, in which all 1-hot vectors in the cache with the "1" bit matching the selected TLB entry will be invalidated. However, since the blind invalidate operation only overwrites the 1-hot vector and not the associated parity bit, the associated parity bit is no longer valid for the new value in the 1-hot vector. In addition, in the 1-hot cache, since all of the cleared bits are now zero, if any of the bits are changed by a soft error to a 1, then, the cleared entry becomes a 1-hot vector, which is indistinguishable from a real, valid 1-hot vector that also may be stored in the 1-hot cache. A "soft" error is an error that occurs when a bit value that is set to a particular value in the processor is changed to an opposite value by, for example, an alpha particle bombardment and/or gamma-ray irradiation of the bit.

A straight forward protection scheme for the 1-hot tag cache that does work for the 1-hot vectors involves having a second tag array to maintain a duplicate copy of the 1-hot vectors in the tag array. However, although this duplicate tag array scheme works, it requires a larger chip area and a high timing impact to implement.

DETAILED DESCRIPTION

In accordance with embodiments of the present invention, circuits and methods to protect the 1-hot vectors used in the tag cache are described herein. As a way of illustration only, two embodiments of the present invention are described: a 1-hot plus valid bit and a 2-hot vector scheme, however, these two embodiments should not be taken to limit any alternative embodiments, which fall within the spirit and scope of the appended claims.

In general, a cache that stores 1-hot vectors as tags is referred to as a 1-hot tag cache and a cache that stores 2-hot vectors as tags is referred to as a 2-hot tag cache. A 1-hot vector is an n-bit string that contains a single "1" and n-1 "0's", for example, "00001000" is an eight-bit 1-hot vector. Similarly, a 2-hot vector is an n-bit string that contains two consecutive "1's" and n-2 "0's", for example, "00011000" is an eight-bit 2-hot vector. The right most "1" bit in a 2-hot vector is called a primary bit and a left neighbor "1" bit of the primary bit is called an aux (auxiliary) bit.

Figure 1:
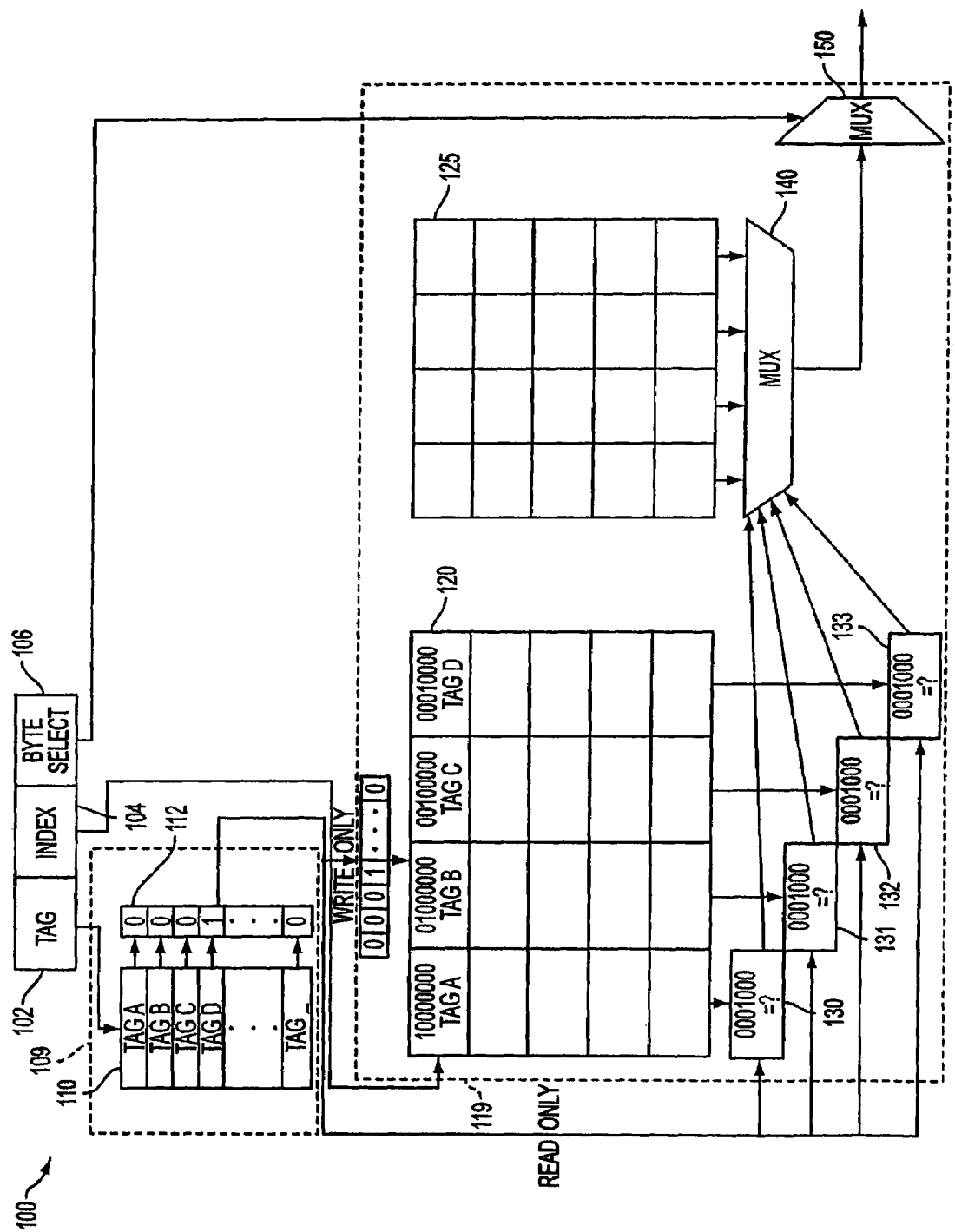
FIG. 1 is a logic block diagram of a 1-hot tag cache, in accordance with an embodiment of the present invention.

FIG. 1 is a logic block diagram of a known implementation of a 1-hot tag cache 119. The 1-hot tag cache 119 shown in FIG. 1 is a 4-way set associative cache, which means that four tags are stored for any given set (row) in the cache. In FIG. 1, the 1-hot tag cache 119 is coupled to a TLB 109, which includes a TLB virtual address array 110. The 1-hot tag cache 119 includes a 1-hot tag array 120, a cache data array 125, comparators 130-133, a first multiplexer 140, and a second multiplexer 150.

In FIG. 1, during a read request, the TLB virtual address array 110, receives a tag 102 from an incoming tag cache access address request 100 that specifies the desired tag in the TLB virtual address array 110 and, based on the virtual address stored in the specified tag, outputs an n-bit 1-hot vector 112, where the number of bits, n, in the 1-hot vector is equal to the size of the TLB, that is, the number of tags in the TLB. At generally about the same time that the TLB virtual address array 110 receives the tag 102, the 1-hot tag array 120 receives an index address 104 that specifies which set, that is, row, in the 1-hot tag array 120 to read out and, then, the 1-hot tag array 120 reads out the tags from the memory cells in the specified set. The comparators 130-133 each receive one of the tags read out from the 1-hot tag array 120 and the 1-hot vector 112 from the TLB. Each of the comparators 130-133, then compares the 1-hot vector 112 with the tag it received from the 1-hot tag array 120 to determine if the received tag is the desired tag from the set. Each of the comparators 130-133, outputs a value representing whether the desired tag was located in that specific comparator to a first multiplexer 140. The first multiplexer 140 also receives four-way data from the data cache array 125 as specified in the index address 104 and, then, based on the values of the comparators 130-133, determines which one way of the four-way data to read out. If there is a match between the desired tag value and one of the four-way data values, the way that matched is read out of the first multiplexer 140. The second multiplexer 150 receives the read-out data and a byte select value 106 from the incoming tag cache access address request 100 and, then, based on the byte select value 106, the second multiplexer 150 outputs the desired data.

Figure 2:
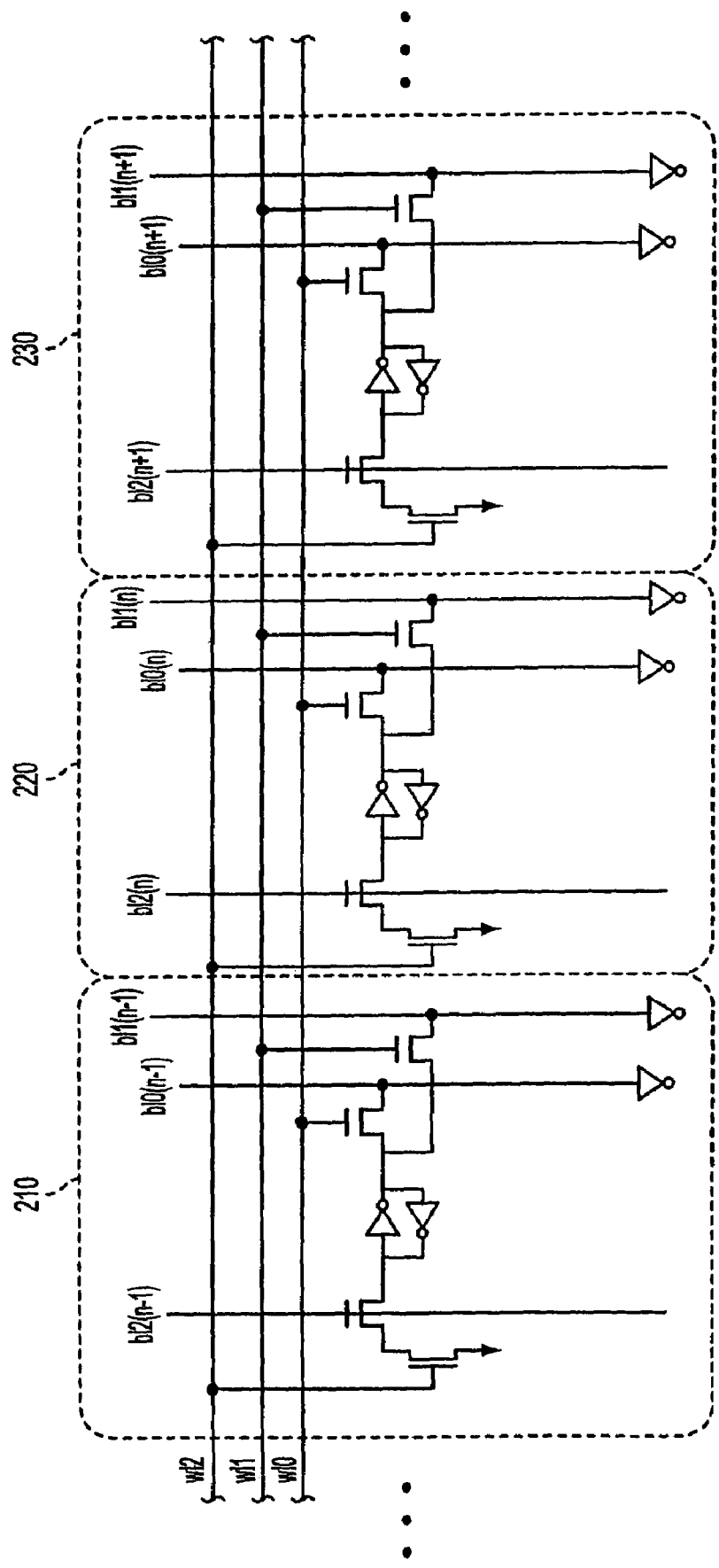
FIG. 2 is a circuit schematic diagram of a known 1-hot tag memory cell, illustrating how the 1-hot tag cache operates with no interaction between the memory bit circuits in the 1-hot tag memory cell.

FIG. 2 is a circuit schematic diagram of a known 1-hot tag memory cell architecture, illustrating how the 1-hot tag cache can operate with no interaction between the memory bit circuits in the 1-hot tag memory cell. In FIG. 2, the 1-hot tag memory cell is shown to include word lines wl0, wl1 and wl2 that are coupled to memory bit circuits 210, 220 and 230. The memory bit circuits 210, 220 and 230 are coupled together with a plurality of other memory bit circuits to form an n-bit memory cell. In FIG. 2, for ease of illustration, only the memory bit circuits 210, 220 and 230 are shown, the remainder being generally indicated by the dotting to the left of memory bit circuit 210 and to the right of memory bit circuit 230. Each of the memory bit circuits 210, 220 and 230 include bit lines bl0, bl1 and bl2. The bit lines bl0 and bl1 can be used to read out the content of the memory bit circuits and bl2 can be used to write data to the memory bit circuits 210, 220 and 230.

Operation of the 1-hot tag array. In FIG. 2, the 1-hot tag array has two read ports. For a read operation in the 1-hot tag array, either wl0 or wl1 can be asserted to read out a bit from each memory bit circuit 210, 220 and 230 on the memory bit circuit's bl0 or bl1, respectively.

In FIG. 2, performing a write operation in the 1-hot tag memory cell requires two phases. In the first phase, in each memory bit circuit 210, 220 and 230, one or both of the bit lines bl0 and bl1 can be grounded to "0" and one or both of the word lines wl0 and wl1 can be asserted, to write a "0" into each memory bit circuit 210, 220 and 230. In the second phase, wl2 can be asserted and the data indicated on the bl2 line is a blind clear (bc) signal in an inverted form, which is the inverse of the data to be written to the 1-hot array. That is, in the inverted form of the bc signal, in all of the memory bit circuits where a "1" is to be written the bl2 will have a value equal to "0" and in all memory bit circuits where a "0" is to be written the bl2 will have a value equal to "1". In this way, the inverse of the 1-hot vector is written into the memory cell, for example, if an 8-bit 1-hot vector value is "00010000" then an inverse 8-bit bc signal, which will be written into the memory cell, is "11101111". The bit values will be inverted when they are read out of the array, thus, producing the desired 1-hot vector.

In FIG. 2, to perform a blind invalidate in the 1-hot tag memory cell, the wl2 line of all rows are asserted and each bl2 contains the non-inverted version of the 1-hot vector bit, which clears the content of all of the memory bit circuits in the 1-hot memory cell indicated by the 1-hot vector.

In accordance with an embodiment of the present invention, a 1-hot plus valid bit scheme involves adding one bit to each 1-hot vector to serve as a valid identification ($V_{id}$) bit. In the 1-hot plus valid bit scheme, while conceptually simple, a multi-cycle read-modify operation can be used to update the valid bit to avoid the timing impact. In addition, in accordance with an embodiment of the present invention, in the 1-hot plus valid bit scheme an additional word line is used to read out the content of the 1-hot column. Therefore, in accordance with an embodiment of the present invention, in this scheme, a single bit is appended at the end of each 1-hot vector to serve as the $V_{id}$ bit.

Figure 3:
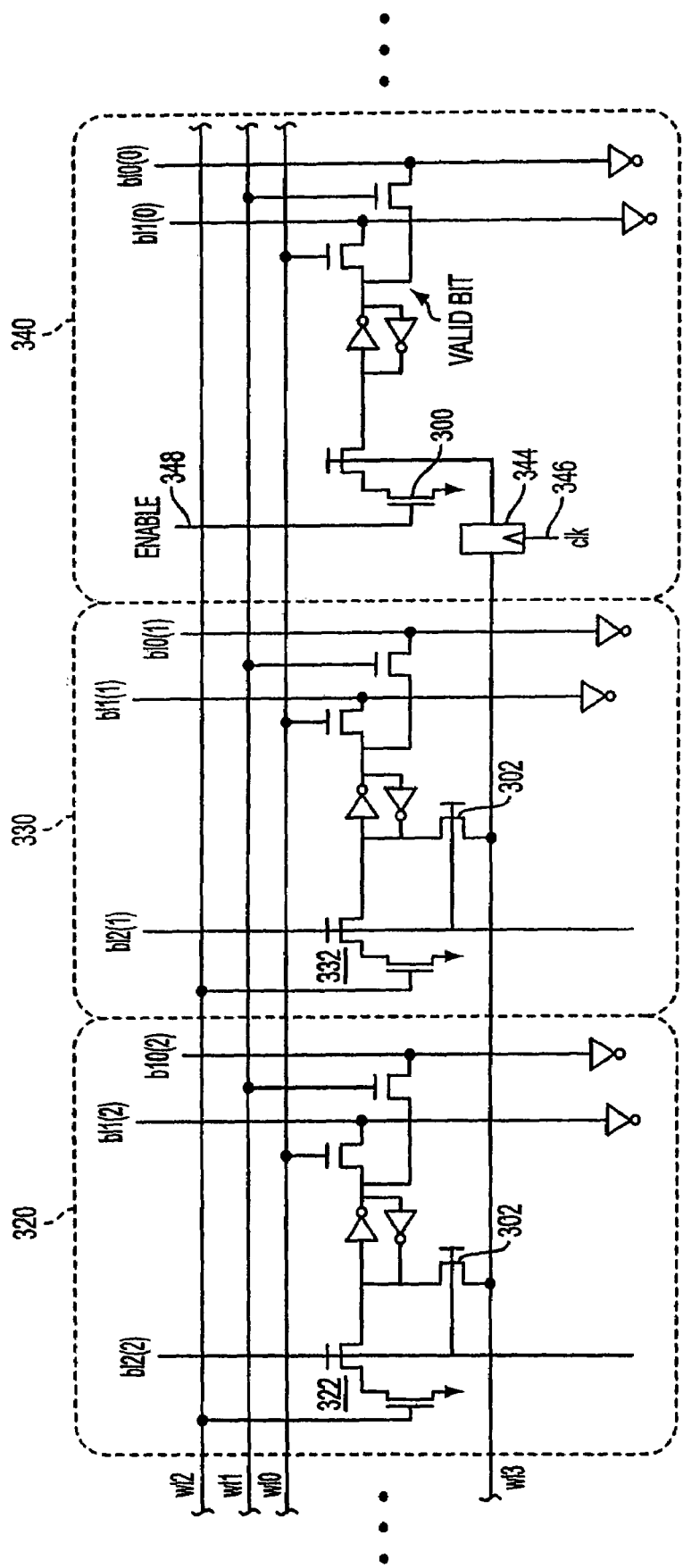
FIG. 3 is a circuit schematic diagram of a 1-hot tag plus valid bit memory cell, illustrating the interaction between the memory bit circuits in the 1-hot tag plus valid bit memory cell, in accordance with an embodiment of the present invention.

FIG. 3 is a circuit schematic diagram of a 1-hot tag plus valid bit memory cell, illustrating the interaction between the memory bit circuits in the 1-hot tag plus valid bit memory cell, in accordance with an embodiment of the present invention. In the circuit illustrated in FIG. 3, the $V_{id}$ bit memory bit circuit 340 is shown as an extra bit circuit coupled at the end of the plurality of memory bit circuits that make up the 1-hot memory cell of FIG. 2. For the sake of clarity, an analogous memory bit circuit for the memory bit circuit 210 of FIG. 2 has been omitted from FIG. 3. In FIG. 3, the structure of the $V_{id}$ bit memory bit circuit 340 is different than the memory bit circuits 320 and 330 in the 1-hot memory cell in that the $V_{id}$ bit memory bit circuit 340 does not have the bl2 bit line. In place of the bl2 line is the output of a latch 344. Furthermore, the gate of transistor 300, which, when turned on, can cause the value at the output of the latch 344 to affect the value stored in the $V_{id}$ bit memory bit circuit 340, which is coupled to a bit enable line 348. The embodiment in FIG. 3 also has an additional word line w13, which is the input to the latch 344. The w13 word line also is coupled to transistors 322 and 332, each of which is coupled to the bl2 bit line in each of the memory bit circuits 320 and 330, respectively. Furthermore, each of memory bit circuits 320, 330, etc. have an additional transistor 302, which is coupled to the bl2 bit line in the respective memory bit circuits 320 and 330. The latch 344 is also coupled to a clock output 346.

In accordance with embodiments of the present invention, on a read operation in the 1-hot plus valid bit scheme, the $V_{id}$ bit is accessed at the same time as the 1-hot vector and, if the $V_{id}$ bit is set, the 1-hot vector is considered valid, otherwise, the 1-hot vector is considered invalid by external processor logic (not shown). The $V_{id}$ bit is cleared on a blind invalidate just as for the 1-hot tag array. The detailed operation of the 1-hot plus $V_{id}$ bit is described below. It should be noted that the 1-hot plus $V_{id}$ bit scheme is somewhat slower than the 1-hot tag memory cell due to the added read port via w13 being slower than wl0 and wl1.

Operation of the 1-hot plus valid bit. In FIG. 3, in accordance with an embodiment of the present invention, for a read operation in the 1-hot tag plus valid bit memory cell, either wl0 or wl1 is asserted to read out the content of the bits in the array on bl0 or bl1, respectively. Similarly, the valid bit is read at the same time as the 1-hot vector bits. A 1-hot vector that does not have the valid bit set is considered an error, which causes the processor to vector into the error recovery firmware (FW) code. This FW code will flush the entire cache to correct the error.

In accordance with an embodiment of the present invention, in FIG. 3, a write operation in the 1-hot tag plus valid bit memory cell is performed in two phases in the same manner as described above for the write operation in the 1-hot tag memory cell. In the first phase of a clock cycle (each clock has a high phase and a low phase), in each memory bit circuit 320 and 330, one or both of the bit lines bl0 and bl1 are grounded to "0" and one or both of the word lines wl0 and wl1 are asserted, to write a "0" into each memory cell 320 and 330. In the second phase, wl2 is asserted and the data indicated on the bl2 lines is a blind clear (bc) signal in an inverted form, which is the inverse of the data to be written to the 1-hot array. That is, in the inverted form of the bc signal, in all of the memory bit circuits where a "1" is to be written the bl2 will have a value equal to "0" and in all of the memory bit circuits where a "0" is to be written the bl2 will have a value equal to "1". In this way, the inverse of the 1-hot vector is written into the memory cell, for example, if the 8-bit 1-hot vector value is "00010000" then the inverse 8-bit bc signal, which will be written into the cell, is "11101111". The bit values will be inverted when they are read out of the array, thus, producing the desired 1-hot vector.

In accordance with an embodiment of the present invention, in FIG. 3, a blind invalidate is performed in 2 clock cycles in the 1-hot tag array. In the first clock cycle, the 1-hot vector bit values can be indicated by the n bl2 bit lines and wl2 word lines of all rows are asserted. As a result, all rows that are indicated by the 1-hot vector will be cleared, that is, invalidated. In addition, if any of the bits of a cleared cell in the rows contain a "1", then the latch 344 can be set via wl3. In the second clock cycle the enable bit line 348 can be asserted and the valid bit can be cleared as well.

2-hot vector protection scheme. In accordance with an embodiment of the present invention, in the 2-hot vector scheme, the 1-hot vector is converted to a 2 hot vector. This is accomplished by local logic prior to the cache tag during the write operation of the 1-hot vector into the tag. During the read out, the 2-hot vector is automatically converted back to a 1-hot vector by local logic subsequent to the cache tag. In this way, the accesses of the cache work identically to the 1-hot tag cache described above.

In accordance with an embodiment of the present invention, while the 2-hot vector scheme is more complicated, it does not require the multi-cycle operation of the 1-hot plus valid bit scheme. In addition, in accordance with an embodiment of the present invention, the 2-hot scheme does not require additional bit lines or word lines.

Figure 4:
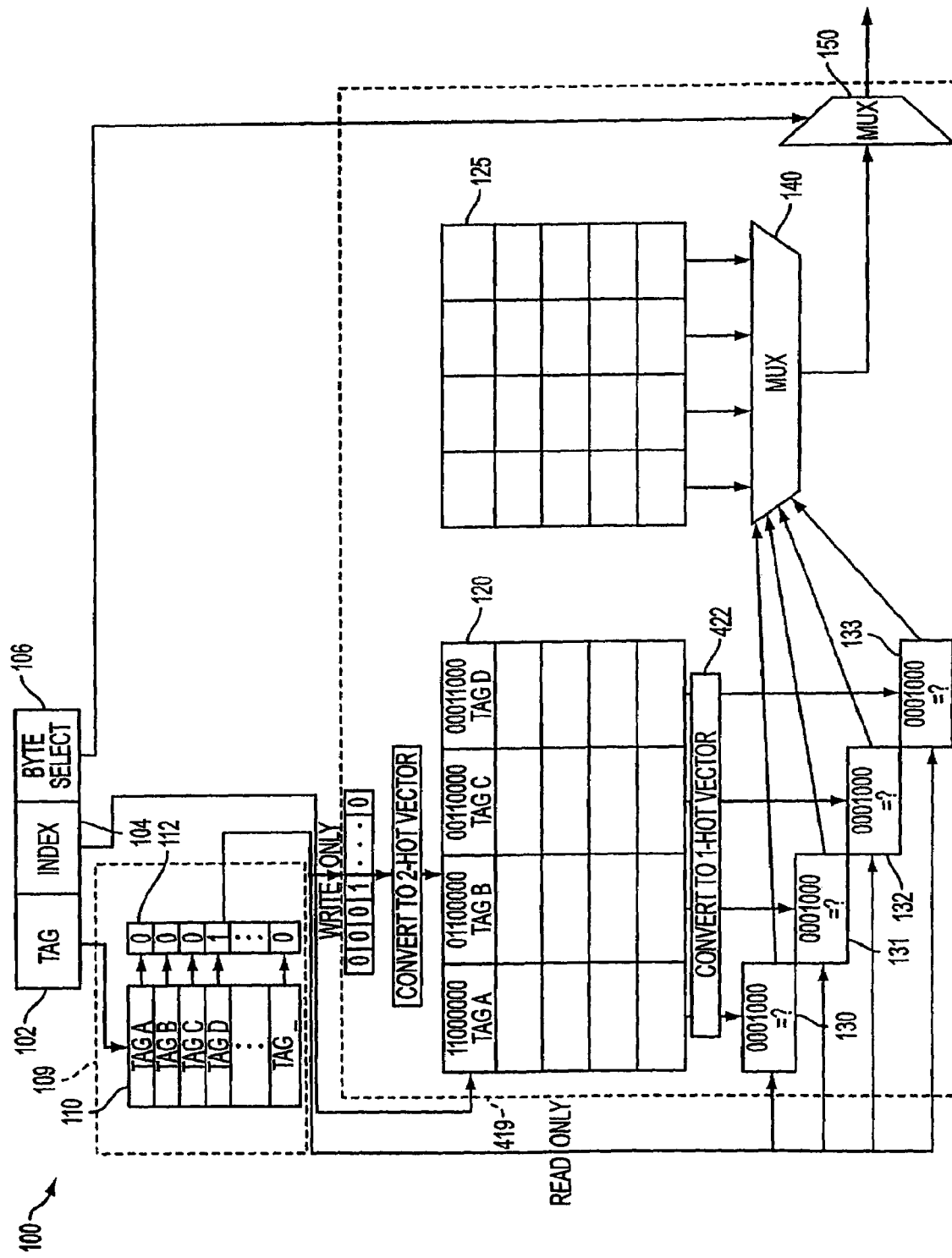
FIG. 4 is a logic block diagram of a 2-hot tag cache based on the 1-hot tag cache in FIG. 1, in accordance with an embodiment of the present invention.

FIG. 4 is a logic block diagram of a 2-hot tag cache 419 based on the 1-hot tag cache in FIG. 1, in accordance with an embodiment of the present invention. In FIG. 4, the 2-hot tag cache 419 works in a similar way as the 1-hot cache 119 in FIG. 1 except that, in FIG. 4, the 1-hot vector tag is converted to a 2-hot vector and then stored in the 2-hot tag array 420. In FIG. 4, the numbering convention used in FIG. 1 has been continued in FIG. 4 for those elements that remain unchanged from FIG. 1. In FIG. 4, a convert to 2-hot vector block 418 is coupled to the write data path of the 2-hot tag array 420 and the convert to 2-hot vector block 418 receives the incoming 1-hot vector data and then converts the 1-hot vector to the 2-hot vector. The 2-hot vector is then stored in the 2-hot tag array 420. An output of the 2-hot tag array 420 is coupled to a convert to 1-hot vector block 422, which converts the 2-hot vectors from the 2-hot tag array 420 back to 1-hot vectors, which are then input into the comparators 130-133 and the operation continues as described above for the 1-hot tag cache of FIG. 1.

Figure 5:
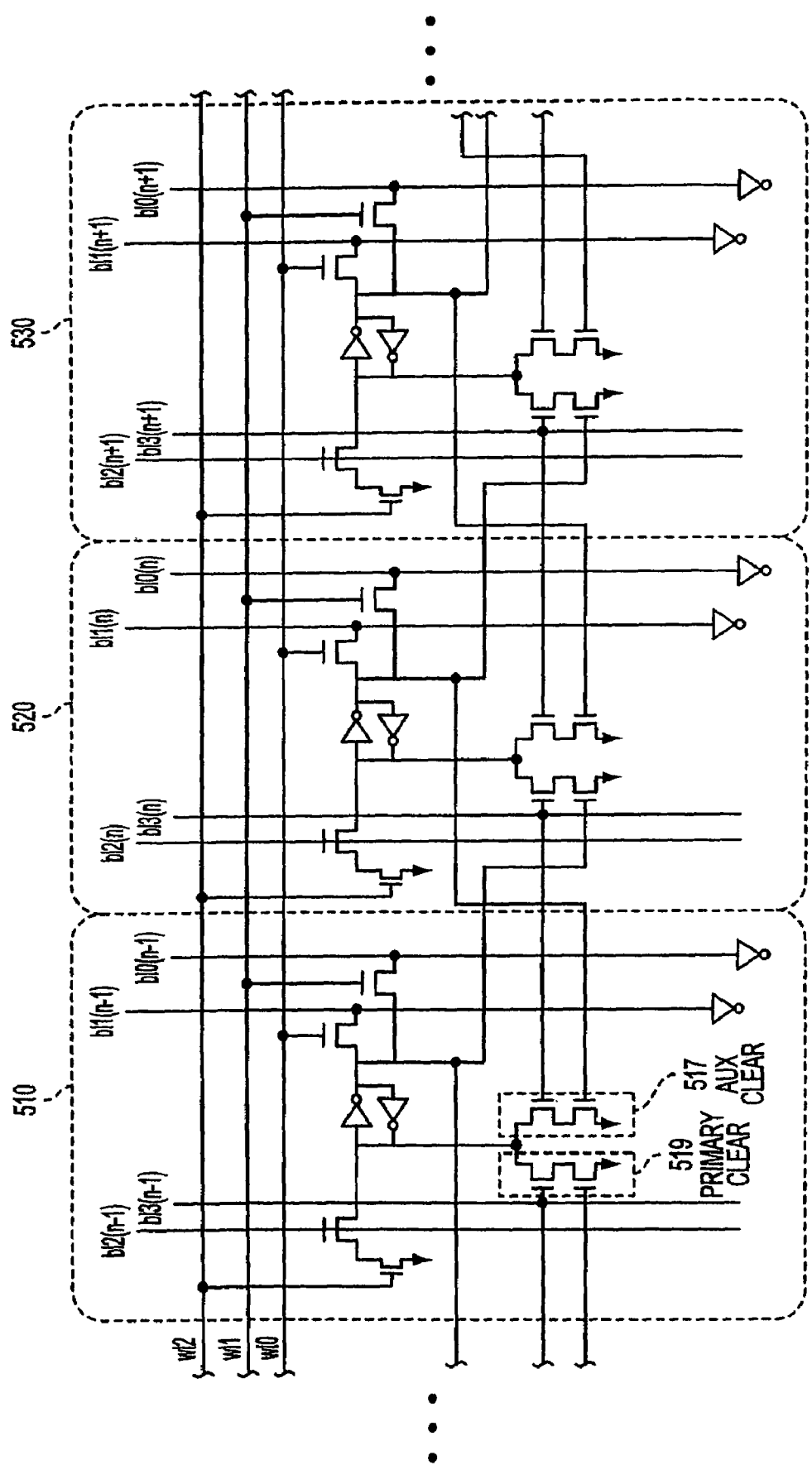
FIG. 5 is a circuit schematic diagram of a 2-hot tag memory cell, illustrating the interaction between the memory bit circuits in the 2-hot memory cell, in accordance with an embodiment of the present invention.

FIG. 5 is a circuit schematic diagram of a 2-hot tag memory cell, illustrating the interaction between the memory bit circuits in the 2-hot tag memory cell, in accordance with an embodiment of the present invention. In FIG. 5, the 1-hot tag memory cell shown in FIG. 2, is illustrated with modifications that convert the 1-hot tag memory cell to a 2-hot tag memory cell, in accordance with an embodiment of the present invention. In FIG. 5, each memory bit circuit 510, 520 and 530 in the 2-hot tag memory cell is implemented with a primary clear bit line b13 that is coupled to a primary clear circuit 519, which is coupled to each memory bit circuit 510, 520 and 530 to clear the bit in that memory bit circuit. In accordance with an embodiment of the present invention, an auxiliary clear circuit 517 is coupled to a primary clear circuit 519 in memory bit circuit 510 and clears the aux bit in the memory cell to the right of the memory cell that contains the primary bit. Similar auxiliary clear and primary clear circuits are implemented in each of the memory bit circuits in the 2-hot tag memory cell.

Operation of the 2-hot tag cache. In FIG. 5, in accordance with an embodiment of the present invention, the read operation is the same as the read operation in the 1-hot tag memory cell in FIG. 2, in which a 1-hot vector is read out. Specifically, for the read operation either wl0 or wl1 can be asserted to read out the content of the bits in the memory cell on bl0 or bl1, respectively. When this occurs, the 2-hot vector data stored in the 2-hot tag array can be read out and converted back to a 1-hot vector by the convert to 1-hot vector block 422 of FIG. 4 (not shown in FIG. 5). Before the conversion from a 2-hot to a 1-hot vector, the 1-hot vector coming from the 2-hot cache tag can be considered an error and can cause the processor to vector to the FW code for proper error recovery.

In accordance with an embodiment of the present invention, in FIG. 5, for a write operation in the 2-hot tag memory cell, the write operation is performed in the same manner as described above for the 1-hot tag memory cell in FIG. 2, except that the data is stored as a 2-hot vector.

In accordance with an embodiment of the present invention, in FIG. 5, a blind invalidate is performed by asserting the b13 bit lines to cause each memory bit circuit to look at the memory bit circuit's right neighbor blind clear signal (bc) and the memory bit circuit's left and right neighboring memory bit circuits. Specifically, the bits to be invalidated will be indicated by the b13 lines in a 1-bit format. The aux bit is cleared if and only if the aux bit's primary b13 bit line is asserted and its left neighbor bit is a "0". The primary bit is cleared if the primary bit's b13 bit line is asserted and the left neighbor of the primary bit is a "0".

While the aux bit has been described located in the bit just to the right of the primary bit, in an alternate embodiment of the present invention, the aux bit can be located in any bit position within the 2-hot vector. However, embodiments in which the aux bit is located closer to the primary bit, in general, perform better than those embodiments in which the aux bit is located farther away from the primary bit.

Figure 6:
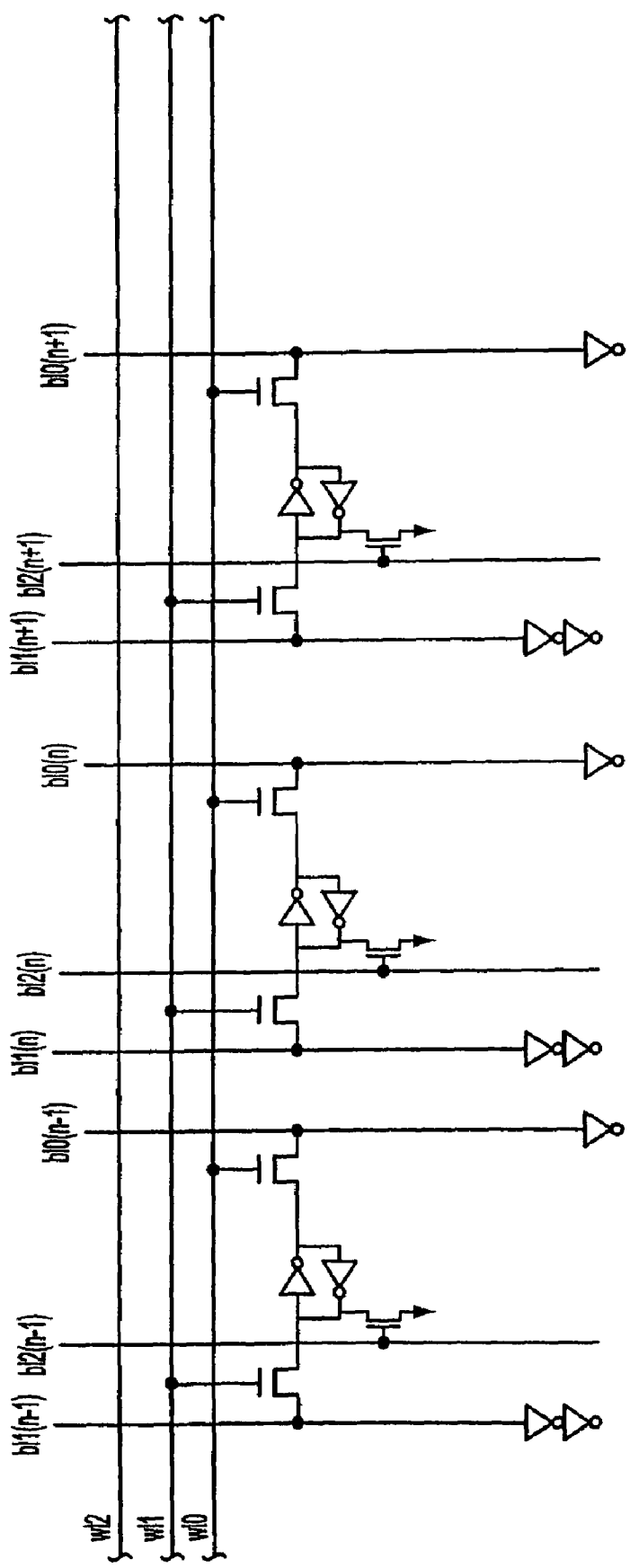
FIG. 6 is a circuit schematic diagram of a known alternative 1-hot tag memory cell, which also illustrates how the 1-hot tag cache operates with no interaction between the memory bit circuits in the 1-hot tag memory cell.

FIG. 6 is a circuit schematic diagram of a known alternative 1-hot tag memory cell, which also illustrates how the 1-hot tag cache operates with no interaction between the memory bit circuits in the alternative 1-hot tag memory cell. In FIG. 6, the read operation is performed in the same manner as described above for the read operation in the 1-hot tag memory cell in FIG. 2. Specifically, in FIG. 6, for the read operation either wl0 or wl1 can be asserted to read out the content of the bits in the 1-hot tag memory cell on bl0 or bl1, respectively.

In accordance with an embodiment of the present invention, in FIG. 6, to perform a write operation, in the 1-hot tag memory cell, wl0 and wl1 can be selected. The data can be indicated on bit lines bl0 and bl1. The data on the bl1 bit line can be the inverted version of the data on the bl0 bit line in each memory bit circuit. In this way, differential writes can be implemented.

In accordance with an embodiment of the present invention, in FIG. 6, to perform a blind invalidate in the 1-hot tag memory cell the bl2 line can be asserted, which causes each of the bit circuits to be discharged and a "0" to be written into each of the bit circuits.

Figure 7:
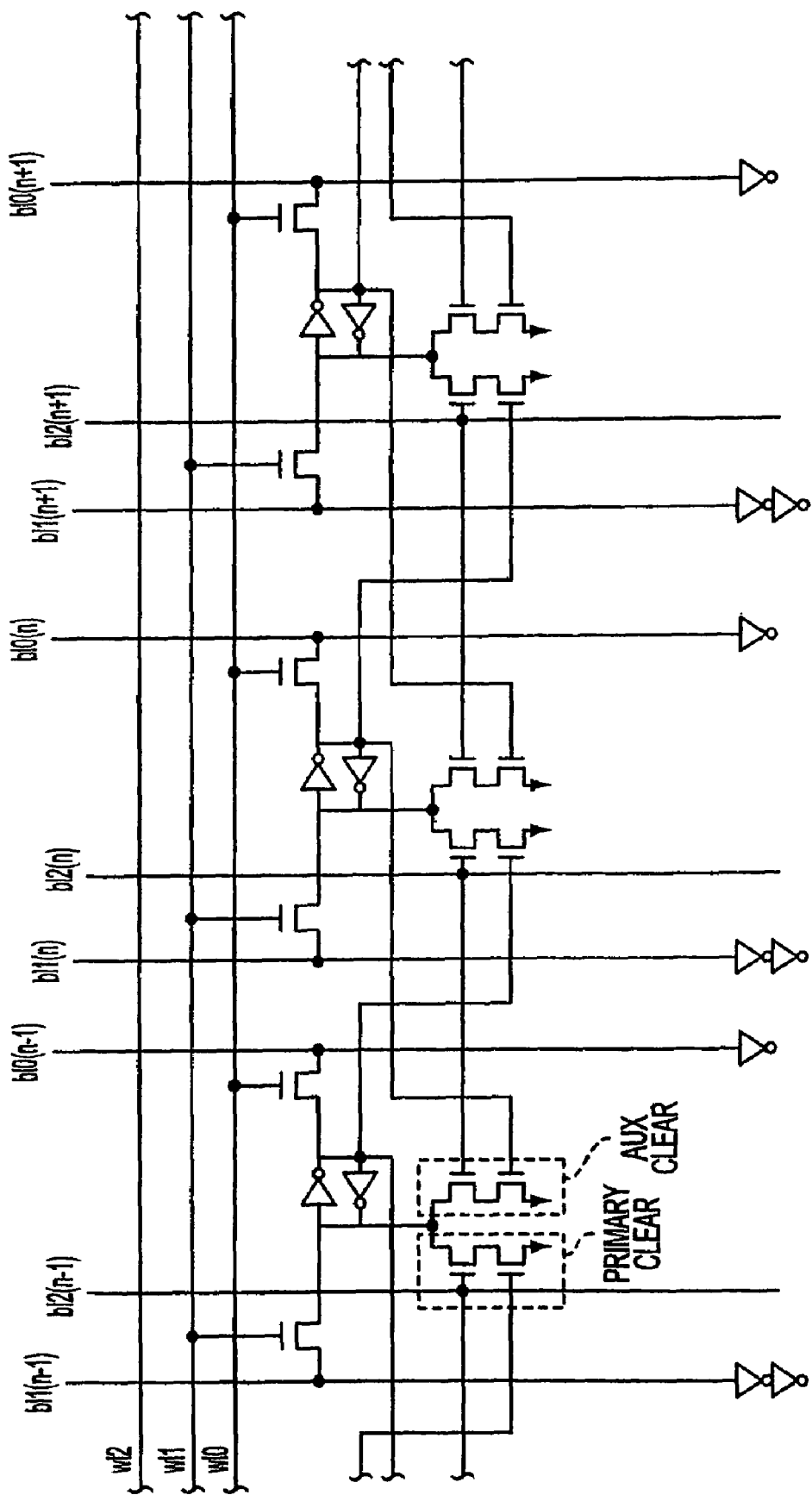
FIG. 7 is a circuit schematic diagram of an alternative 2-hot tag memory cell, implemented from the 1-hot tag memory cell in FIG. 6, which illustrates the interaction between the memory bit circuits in the 2-hot memory cell, in accordance with an embodiment of the present invention.

FIG. 7 is a circuit schematic diagram of an alternative 2-hot tag memory cell, implemented from the 1-hot tag array cell in FIG. 6, illustrating the interaction between the memory bit circuits in the 1-hot tag memory cell, in accordance with an embodiment of the present invention. In FIG. 7, the interaction between the primary bit and the left and right neighbor bits of the primary bit are illustrated. In FIG. 7, in accordance with an embodiment of the present invention, the read operation is performed in the same manner as described above for the read operation in the 1-hot tag memory cell in FIG. 6. Specifically, for the read operation either wl0 or wl1 can be asserted to read out the content of the bits in the 2-hot tag memory cell on bl0 or bl1, respectively.

In accordance with an embodiment of the present invention, in FIG. 7, for a write operation in the 2-hot tag memory cell, the write operation can be performed in the same manner as described above for the 1-hot tag memory cell in FIG. 6, except that the data to be stored is a 2-hot vector.

In accordance with an embodiment of the present invention, in FIG. 7, a blind invalidate can be performed by asserting the bl2 bit lines to cause each bit to look at the bit's right neighbor blind clear signal (bc) and the bit's left and right neighboring bits. Specifically, the bits to be invalidated can be indicated by the bl2 lines in a 1-bit format. The aux bit can be cleared if and only if the aux bit's primary bl2 bit line is asserted and its left neighbor bit is a "0". The primary bit can be cleared if the primary bit's bl2 bit line is asserted and the left neighbor of the primary bit is a "0". In the blind invalidate the data can be a 1-hot vector and the aux and primary bits can be invalidated in the same cycle.

While the embodiments described above relate to the 1-hot plus valid bit and 2-hot vector embodiments, they are not intended to limit the scope or coverage of the present invention. In fact, for example, the 2-hot scheme described above can be extended to a 3-hot vector to protect errors in 2 consecutive bits or to a 4-hot or higher vector to protect errors in 3 and higher consecutive bits, respectively. Similarly, other bit patterns other than the 2-hot scheme may be used depending on the type of the errors, such as, for example, double bit errors, that a designer is trying to protect against.

In addition, the 1-hot plus valid bit scheme is, generally, good for microprocessor designs that are not wire congested in the physical layout and, thus, have available area for the additional read line. Likewise, the 2-hot scheme is good for microprocessor designs that are, generally, wire congested in the physical layout and, thus, do not have much available area for the additional hardware that is associated with the 1-hot plus valid bit scheme.

The 2-hot scheme described above minimizes global routing at the expense of local interconnect and transistors. Other 2-hot schemes can use a multiple clock blind invalidation scheme by using a different signal for invalidating the aux bit.

Both the 1-hot plus valid bit and 2-hot vector protection schemes can be implemented in high performance microprocessors and high performance multi-processors on a single chip.

It should, of course, be understood that while the present invention has been described mainly in terms of microprocessor- and multi-processor-based personal computer systems, those skilled in the art will recognize that the principles of the invention may be used advantageously with alternative embodiments involving other integrated processor chips and computer systems. Accordingly, all such implementations which fall within the spirit and the broad scope of the appended claims will be embraced by the principles of the present invention.

What is claimed is:

1. A tag array memory comprising:
   an input conversion circuit to receive a first n-bit binary address that contains a single one and n-1 zeros to specify a matching address translation entry in a translation look-aside buffer and to convert the first n-bit binary address to a second n-bit binary address that contains two consecutive ones and n-2 zeros;
   a memory array coupled to the input conversion circuit, the memory array to store the second n-bit binary address; and
   an output conversion circuit coupled to the memory array, the output conversion circuit to receive the second n-bit binary address and to convert the second n-bit binary address back to the first n-bit binary address.

2. The tag array memory of claim 1 wherein the memory array comprises:
   a plurality of n-bit memory cells wherein each n-bit memory cell comprises:
      a plurality of memory bit circuits coupled together, each of the plurality of memory bit circuits having a plurality of blind invalidate circuits, each blind invalidate circuit being coupled to a left neighbor bit circuit and a right neighbor bit circuit, and each blind invalidate circuit to check a bit value of the right neighbor memory bit circuit and a bit value of the left neighbor memory bit circuit.

3. The tag array memory of claim 2 wherein each of the plurality of blind invalidate circuits comprises:
   a primary clear bit line;
   a primary clear circuit coupled to the primary clear bit line to receive a bit value of a left-adjacent memory bit circuit; and
   an auxiliary clear circuit coupled to the primary clear circuit and to the primary clear circuit of a right-adjacent memory bit circuit, the auxiliary clear circuit to receive a bit value of the right-adjacent memory bit circuit.

4. The tag array memory of claim 3 wherein the primary clear circuit is to clear the bit in the memory bit circuit if the primary clear bit line is asserted and the bit value of the right-adjacent memory bit circuit is zero.

5. The tag array memory circuit of claim 4 wherein the auxiliary clear circuit is to clear the bit in the memory bit circuit, if the primary clear bit line is asserted and the bit value of the left-adjacent memory bit circuit is zero.

6. The tag array memory circuit of claim 4 wherein the primary clear circuit is to clear the bit in the memory bit circuit in a single clock cycle.

7. The tag array memory of claim 3 wherein the auxiliary clear circuit is to clear the bit in the memory bit circuit if the primary clear bit line is asserted and the bit value of the left-adjacent memory bit circuit is zero.

8. The tag array memory circuit of claim 7 wherein the auxiliary clear circuit is to clear the bit in the memory bit circuit in a single clock cycle.

9. The tag array memory of claim 1 wherein the input conversion circuit is coupled to the translation look-aside buffer.

10. The tag array memory of claim 9 wherein the input conversion circuit is to receive the first n-bit binary address from the translation look-aside buffer.

11. The tag array memory of claim 9 wherein the memory array is to receive the second n-bit binary address from the input conversion circuit and an index value.

12. The tag array memory of claim 11 wherein the index value is received from an incoming tag cache access request.

13. The tag array memory of claim 1 further comprising:
a plurality of comparators coupled to the output conversion circuit.

14. The tag array memory of claim 13 wherein the translation look-aside buffer is coupled to the input conversion circuit and the plurality of comparators are further coupled to the translation look-aside buffer to receive the first n-bit binary address.

15. The tag array memory of claim 14 further comprising:
a first multiplexer coupled to the plurality of comparators and coupled to a cache data array.

16. The tag array memory of claim 15 further comprising:
a second multiplexer coupled to the first multiplexer, the second multiplexer to receive data from the cache data array and a byte select value.

17. The tag array memory of claim 16 wherein said second multiplexer is to output a byte value using the byte select value.

18. A computer system, comprising:
a processor;
a translation look-aside buffer (TLB); and
a tag array memory coupled to the TLB, the tag array memory comprising:
an input conversion circuit to receive a first n-bit binary address that contains a single one and n-1 zeros to specify a matching address translation entry in the TLB and to convert the first n-bit binary address to a second n-bit binary address that contains two consecutive ones and n-2 zeros;
a memory array coupled to the input conversion circuit, the memory array to store the second n-bit binary address; and
an output conversion circuit coupled to the memory array, the output conversion circuit to receive the second n-bit binary address and to convert the second n-bit binary address back to the first n-bit binary address.

19. The computer system of claim 18 wherein the memory array comprises:
a plurality of n-bit memory cells wherein each n-bit memory cell comprises:
a plurality of memory bit circuits coupled together, each of the plurality of memory bit circuits having a plurality of blind invalidate circuits, each blind invalidate circuit being coupled to a left neighbor bit circuit and a right neighbor bit circuit, and each blind invalidate circuit to check a bit value of the right neighbor memory bit circuit and a bit value of the left neighbor memory bit circuit.

20. The computer system of claim 19 wherein each of the plurality of blind invalidate circuits comprises:
a primary clear bit line;
a primary clear circuit coupled to the primary clear bit line to receive a bit value of a left-adjacent memory bit circuit; and
an auxiliary clear circuit coupled to the primary clear circuit and to the primary clear circuit of a right-adjacent memory bit circuit, the auxiliary clear circuit to receive a bit value of the right-adjacent memory bit circuit.

21. The computer system of claim 20 wherein the primary clear circuit is to clear the bit in the memory bit circuit if the primary clear bit line is asserted and the bit value of the right-adjacent memory bit circuit is zero.

22. The computer system of claim 20 wherein the auxiliary clear circuit is to clear the bit in the memory bit circuit if the primary clear bit line is asserted and the bit value of the left-adjacent memory bit circuit is zero.

23. A method comprising:
receiving a first n-bit binary address that contains a single one and n-1 zeros to specify a matching address translation entry in a translation look-aside buffer;
converting the first n-bit binary address to a second n-bit binary address that contains two consecutive ones and n-2 zeros;
storing the second n-bit binary address; and
invalidating the second n-bit binary address, if the first n-bit binary address becomes invalid.

24. The method of claim 23 wherein converting the first n-bit binary address to a second n-bit binary address, comprises:
determining a primary bit in the first n-bit binary address, the primary bit being the bit with a value of one; and
adding a one to a neighbor bit of the primary bit.

25. The method of claim 24 wherein the neighbor bit is immediately to the left of the primary bit.

26. The method of claim 24 wherein storing the second n-bit binary address comprises:
writing the second n-bit binary address to a memory.

27. The method of claim 26 wherein writing the second n-bit binary address to a memory comprises:
writing the second n-bit binary address to a cache.

28. The method of claim 23 wherein invalidating the second n-bit binary address, if the first n-bit binary address becomes invalid, comprises:
converting the invalid first n-bit binary address to an invalid second n-bit binary address; and
clearing each occurrence of the invalid second n-bit binary address.

29. The method of claim 28 wherein for each invalid second n-bit binary address, clearing each occurrence of the invalid second n-bit binary address comprises:
setting the primary bit equal to zero; and
setting the neighbor bit equal to zero.

30. A machine-readable medium having stored thereon instructions to perform a method comprising:

receiving a first n-bit binary address that contains a single one and n-1 zeros to specify a matching address translation entry in a translation look-aside buffer;

converting the first n-bit binary address to a second n-bit binary address that contains two consecutive ones and n-2 zeros;

storing the second n-bit binary address; and invalidating the second n-bit binary address, if the first n-bit binary address becomes invalid.

31. The machine-readable medium of claim 30 wherein converting the first n-bit binary address and a valid bit to a second n-bit binary address, comprises:

determining a primary bit in the first n-bit binary address, the primary bit being the bit with a value of one; and adding a one to a neighbor bit of the primary bit.

32. The machine-readable medium of claim 31 wherein the neighbor bit is immediately to the left of a primary bit.

33. The machine-readable medium of claim 31 wherein storing the second n-bit binary address, comprises:

writing the second n-bit binary address to a memory.

34. The machine-readable medium of claim 33 wherein writing the second n-bit binary address to a memory comprises:

writing the second n-bit binary address to a cache.

35. The machine-readable medium of claim 30 wherein invalidating the second n-bit binary address, if the first n-bit binary address becomes invalid, comprises:

converting the invalid first n-bit binary address to an invalid second n-bit binary address; and clearing each occurrence of the invalid second n-bit binary address.

36. The machine-readable medium of claim 35 wherein for each invalid second n-bit binary address, clearing each occurrence the invalid second n-bit binary address comprises:

setting the primary bit equal to zero; and setting the neighbor bit equal to zero.

* * * * *